Nov. 7, 1950            C. SEIDLER            2,528,794
ATTACHMENT FOR SUSPENDING CLOTHING
IN AUTOMOBILE BODIES
Filed Aug. 20, 1946                                             2 Sheets-Sheet 1
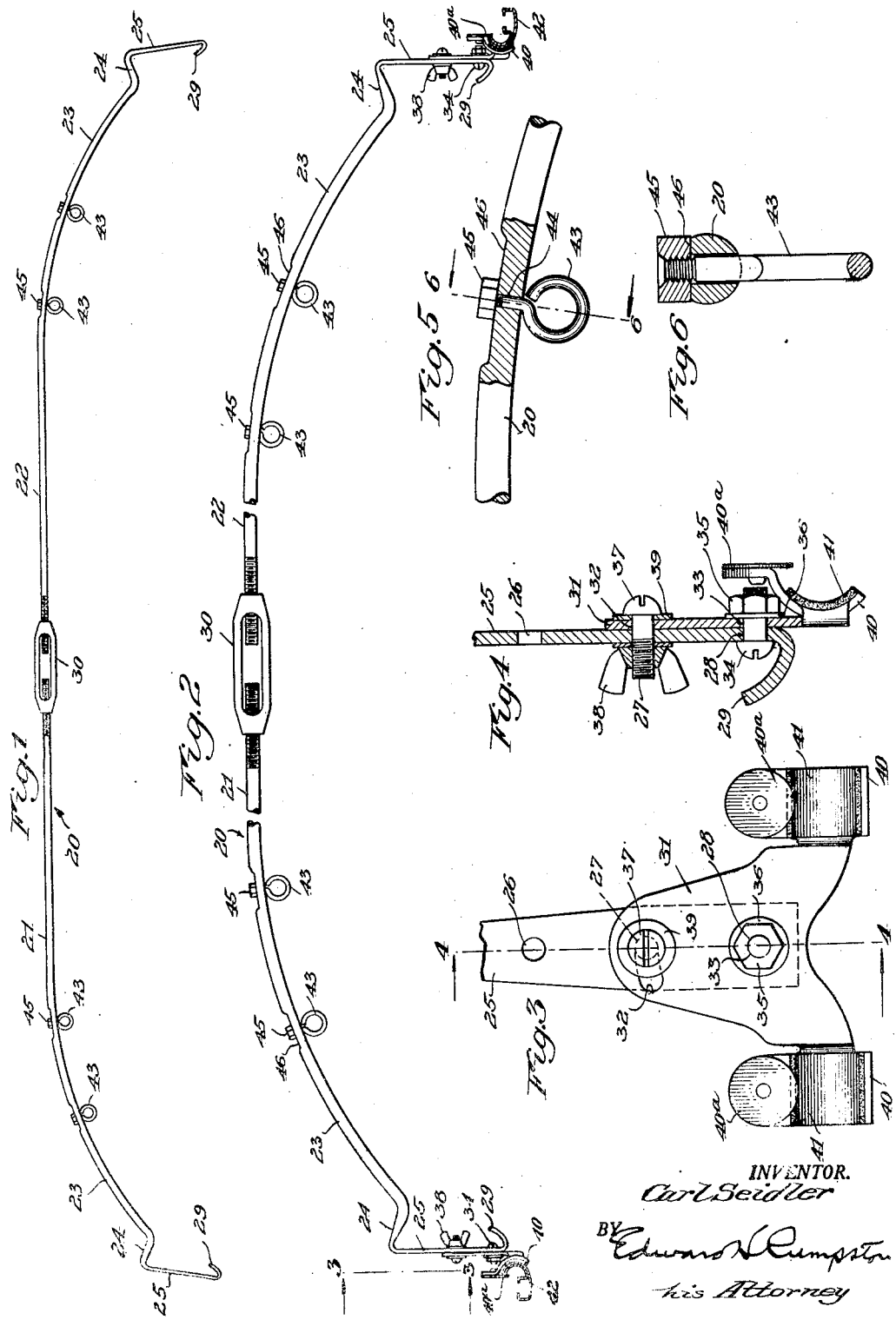
INVENTOR.
Carl Seidler
BY Edward H. Cumpston
his Attorney

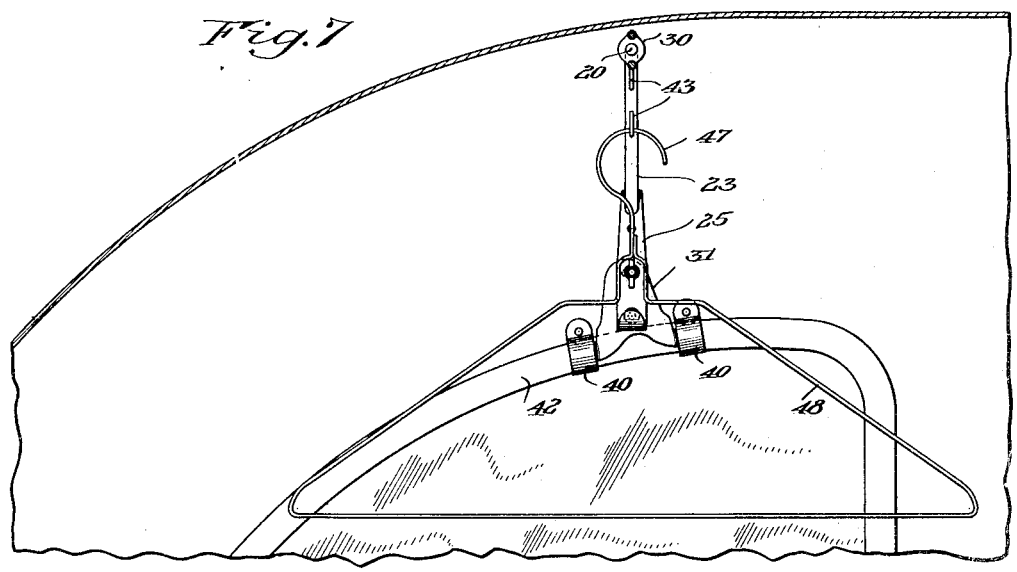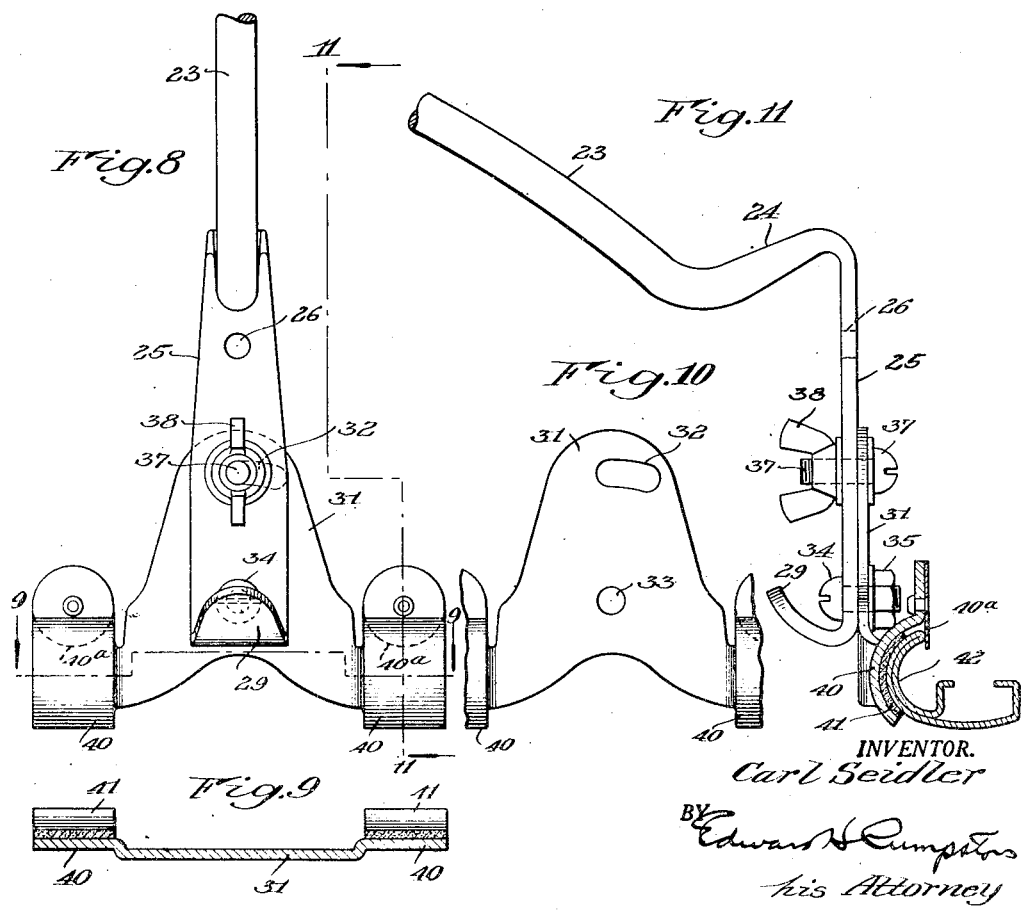

Patented Nov. 7, 1950

2,528,794

UNITED STATES PATENT OFFICE 2,528,794

ATTACHMENT FOR SUSPENDING CLOTHING IN AUTOMOBILE BODIES

Carl Seidler, Rochester, N. Y., assignor, by mesne assignments, to Hang-All Corporation, a corporation of New Jersey Application August 20, 1946, Serial No. 691,679

3 Claims. (Cl. 224—42.1)

1

This invention relates to attachments for the interiors of automobile bodies for supporting articles of clothing in suspended position therein, one object of the invention being to provide an improved device of the above character having a more simple, practical, and convenient construction and mode of operation.

Another object is the provision of such a device having adjustable parts adapted to grip and be supported by standard interior fittings of automobile bodies so as to be detachably fixed in position therein without requiring the addition of any special body fixtures.

Still another object is to supply an attachment having the above advantages in a form of construction capable of being manufactured at a relatively low cost and adapted to be conveniently installed for use.

To these and other ends the invention resides in certain improvements and combinations of parts, all as will be hereinafter more fully described, the novel features being pointed out in the claims at the end of the specification.

In the drawings:

Fig. 1 is a side elevation of an attachment embodying the present invention shown apart from the vehicle body;

Fig. 2 is a similar view, somewhat enlarged, showing the attachment applied to the vehicle body;

Fig. 3 is an enlarged side elevation substantially as seen from the line 3—3 in Fig. 2;

Fig. 4 is a sectional elevation on the line 4—4 in Fig. 3;

Fig. 5 is an enlarged fragmentary elevation of a portion of the attachment showing one of the clothes hanger supports;

Fig. 6 is a sectional elevation on the line 6—6 in Fig. 5;

Fig. 7 is a side elevation of a portion of the interior of the vehicle body showing the attachment in use;

Fig. 8 is a view similar to Fig. 3, but showing the parts from the opposite side thereof;

Fig. 9 is a sectional plan view on the line 9—9 in Fig. 8;

Fig. 10 is a view similar to Fig. 8, but showing a supporting bracket detached and partly broken away, and Fig. 11 is a sectional elevation on the line 11—11 in Fig. 8.

The embodiment of the invention herein disclosed, by way of illustration, comprises, preferably, a metal rod indicated generally at 20, Figs. 1 and 2, made in two alined sections 21 and 22

2 having their inner ends adjustably connected by means hereafter described. The outer end portions of the sections, which are alike, are somewhat curved so that the rod as a whole has the general shape of a bow. The outer end of each section is preferably turned angularly upwardly as at 24 and then flattened and inclined downwardly and outwardly as at 25. Each portion 25 is formed with three alined bolt openings 26, 27, and 28, Figs. 3 and 4, and its tip is rounded and turned upwardly to form a hook 29. The rod is preferably made from round commercial rod stock which may be steel or other suitable material having some resiliency, preferably in the flattened end portions 25, for a purpose hereafter described.

The inner ends of the rod sections are connected by means for effecting relative longitudinal movement toward and from each other to vary the overall length of the rod, such means comprising advantageously a turnbuckle 30 of known construction threadedly engaged at opposite ends with the oppositely threaded inner ends of the sections 21 and 22, so that by turning the buckle in opposite directions, the rods may be moved toward and from each other.

The opposite end portions 25 of the rod are each adjustably connected with a device in the form of a metal plate bracket 31, Figs. 3 and 8, of generally triangular shape, formed with openings 32 and 33 arranged for registry with two of the openings 26, 27, and 28 in the rod end 25, opening 32 of the bracket being in the form of an arcuate slot concentric with opening 33.

Each bracket is pivotally connected with its corresponding rod end by means of a bolt 34, nut 35, and washer 36, Fig. 4, and this bolt may be inserted through opening 28 of the rod end, as shown in the drawings, or through its opening 27, for adjusting the elevation of the rod above the bracket. A bolt 37 inserted through opening 27 of the rod end, as shown in the drawings, or through its upper opening 26, if desired, carries a wing-nut 38 and a washer 39 for clamping the rod end in adjusted position on the bracket. It is evident from this construction that the rod may be adjusted to a higher position by inserting bolt 34 in opening 27 of the rod end and bolt 37 in its opening 26, the rod end being pivoted on the bracket, in either position of adjustment and clamped at a suitable angle by means of the wing-nut 38.

Each bracket 31 is formed at each of its opposite lower corners with a substantially rectangular plate portion or foot 40 for engagement with the opposite side walls of the car body. These bracket portions 40 preferably have their outer sides concavely shaped or curved and lined with an adhering sheet of rubber or other relatively soft material 41, to fit over and grip the projecting garnish molding 42 at the top of the rear window, as shown in Figs. 2, 7, and 11, being thus securely positioned against the molding by pressure applied by lengthening the rod. The lining 41 which may be cemented to the bracket foot, serves to increase its frictional grip on the molding and avoid marring the latter. Preferably also, a thin metal disk 40a is riveted to the upper edge of the foot to slip in behind the molding and afford a more positive grip for the bracket.

Rod 20 is preferably provided at spaced points along its length with convenient means for receiving the hooks of a number of clothes hangers, such as the eye-bolts 43, Figs. 5 and 6, having shanks 44 inserted upwardly through openings drilled through the rod and secured by nuts 45 received in flattened portions 46 on the upper surface of the rod. The eyes 43 of the bolts are adapted for convenient reception of the hooks 47, Fig. 7, of the usual clothes hangers, as 48, and the hooks of other hangers may be readily engaged over the top of the rod itself, as well as over the angularly turned portion 24 and the inturned hook 29 of each outer end of the rod, so as to afford support for a considerable number of clothes hangers.

In mounting the rod in an automobile body, turnbuckle 30 is rotated to retract the rod ends so that the curved feet 40 of the brackets 31 may be readily placed over the window moldings. The buckle is then rotated in the opposite direction to move the rod ends outwardly and press and hold the brackets on the window moldings, the rod ends being flexed from the free position shown in Fig. 1 to the engaged position shown in Fig. 2.

It is evident from the above construction that the rod may be easily and quickly applied to any standard automobile body without requiring the addition of any fittings or other alterations of the interior of the car. As so positioned in the car body, the rod occupies a position adjacent the top of the body, as shown in Fig. 7, being readily adjustable to varying car dimensions by sliding the brackets 25 along the window molding, or by raising or lowering or swiveling the rod ends on the brackets as required, a substantial amplitude of adjustment being thus afforded. In such position, the rod is adapted to support a considerable number of hangers from points adjacent the top of the car, so as to freely suspend the garments and avoid crushing or creasing them.

It will thus be seen that the invention accomplishes its objects and while it has been herein disclosed by reference to the details of a preferred embodiment, it is to be understood that such disclosure is intended in an illustrative, rather than a limiting sense, as it is contemplated that various modifications in the construction and arrangement of parts will readily occur to those skilled in the art, within the spirit of the invention and the scope of the appended claims.

I claim:

1. A clothes rod attachment for automobiles, comprising a rod having aligned sections and adapted to extend within an automobile body from side to side and below the top thereof, said rod having resilient opposite ends turned angularly to said rod, brackets on said rod ends, bracket portions carried by said brackets for gripping automobile body parts located on opposite walls of the automobile body, means adjusting the position of said brackets in the longitudinal direction of the rod ends, means adjusting the position of said brackets transversely to the longitudinal direction of the rod ends, means clamping said brackets in their adjusted positions upon the rod ends, and means moving the aligned sections of said rod to press said bracket portions into firm gripping engagement with the automobile body parts located on opposite walls of the automobile body and thereby hold the rod extended from side to side of the automobile body.

2. A clothes rod attachment for automobiles, comprising a rod having aligned sections and adapted to extend within an automobile body from side to side and below the top thereof, said rod having resilient opposite end portions, each of said end portions having two bends extending in opposite directions and a straight rod end, brackets on said rod ends, bracket portions carried by said brackets for gripping automobile body parts located on opposite walls of the automobile body, means adjusting the position of said brackets in the longitudinal direction of the rod ends, means adjusting the position of said brackets transversely to the longitudinal direction of the rod ends, means clamping said brackets in their adjusted positions upon the rod ends, and means moving the aligned sections of said rod to press said bracket portions into firm gripping engagement with the automobile body parts located on opposite walls of the automobile body and thereby hold the rod extended from side to side of the automobile body.

3. A clothes rod attachment for automobiles, comprising a rod having aligned sections and adapted to extend within an automobile body from side to side and below the top thereof, said rod having resilient opposite ends turned angularly to said rod, brackets on said rod ends, bracket portions carried by said brackets for gripping automobile body parts located on opposite walls of the automobile body, said rod ends having a plurality of longitudinally disposed openings formed therein, bolts extending through some of said openings and through openings formed in said brackets, whereby the position of said brackets may be adjusted in the longitudinal direction of the rod ends, at least one of said openings being elongated and extending substantially transversely to said longitudinal direction, whereby the position of said brackets may be adjusted transversely to the longitudinal direction of the rod ends, and means moving the aligned sections of said rod to press said bracket portions into firm gripping engagement with the automobile body parts located on opposite walls of the automobile body and thereby hold the rod extended from side to side of the automobile body.

CARL SEIDLER.

REFERENCES CITED

The following references are of record in the file of this patent:

UNITED STATES PATENTS

| Number | Name | Date |
| --- | --- | --- |
| 1,377,944 | Tyler | May 10, 1921 |
| 1,716,708 | Shipley | June 11, 1929 |

(Other references on following page)

UNITED STATES PATENTS

| Number | Name | Date |
|---|---|---|
| 1,726,257 | Carlisle | Aug. 27, 1929 |
| 1,748,282 | Ellis | Feb. 25, 1930 |
| 1,891,588 | Claus | Dec. 20, 1932 |
| 1,910,555 | Marlowe | May 23, 1933 |
| 2,031,460 | Chambless | Feb. 18, 1936 |
| 2,045,942 | Brody | June 30, 1936 |
| 2,151,223 | Nayman | Mar. 21, 1939 |
| 2,192,038 | Hausen | Feb. 27, 1940 |
| 2,253,423 | Fellers | Aug. 19, 1941 |
| 2,293,168 | Pirone | Aug. 18, 1942 |
| 2,436,228 | Purchase | Feb. 17, 1948 |
| 2,447,908 | Hoots | Aug. 24, 1948 |

FOREIGN PATENTS

| Number | Country | Date |
|---|---|---|
| 18,927 | France | May 19, 1914 |